US009294460B1

(12) United States Patent (10) Patent No.: US 9,294,460 B1
Thomas (45) Date of Patent: Mar. 22, 2016

(54) SERVICE CREDENTIAL DISTRIBUTION

(71) Applicant: AMAZON TECHNOLOGIES, INC., Reno, NV (US)

(72) Inventor: Eric Anthony Thomas, Richardson, TX (US)

(73) Assignee: Amazon Technologies, Inc., Reno, NV (US)

( * ) Notice: Subject to any disclaimer, the term of this patent is extended or adjusted under 35 U.S.C. 154(b) by 125 days.

(21) Appl. No.: 14/136,662

(22) Filed: Dec. 20, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ...................... *H04L 63/08* (2013.01)

(58) Field of Classification Search
CPC ..................................... H04L 29/06
USPC ............................................. 726/7
See application file for complete search history.

(56) References Cited

U.S. PATENT DOCUMENTS

| 2003/0135859 | A1* | 7/2003 | Putterman et al. ............... 725/78 |
| 2007/0220598 | A1* | 9/2007 | Salowey et al. .................. 726/10 |
| 2014/0006951 | A1* | 1/2014 | Hunter ........................... 715/719 |
| 2014/0364056 | A1* | 12/2014 | Belk et al. ..................... 455/41.1 |

OTHER PUBLICATIONS

HyunYong Lee,; An Approach for Content Sharing among UPnP Devices in Different Home Networks; Year:2007; IEEE; pp. 1419-1425.*

* cited by examiner

*Primary Examiner* — Monjour Rahim
(74) *Attorney, Agent, or Firm* — Lindauer Law, PLLC

(57) ABSTRACT

Described are techniques and systems for providing service account credentials to a media device. A remote control configured to control the media device may include a remote identifier, service account credentials, or both to the media device. The media device may acquire the service account credentials, and configure the media device to perform one or more operations using the service account credentials. As different remote controls associated with different service account credentials are used, the media device is reconfigured according to the inputs from those remote controls.

20 Claims, 10 Drawing Sheets

SERVICE CREDENTIAL DISTRIBUTION

BACKGROUND

A media device may provide access to content such as video, audio, games, and so forth. A service provider may provide a service which delivers the content to the media device, such as through downloading or streaming the content. Traditionally a user would manually configure the media device to use the service.

Figure 1:
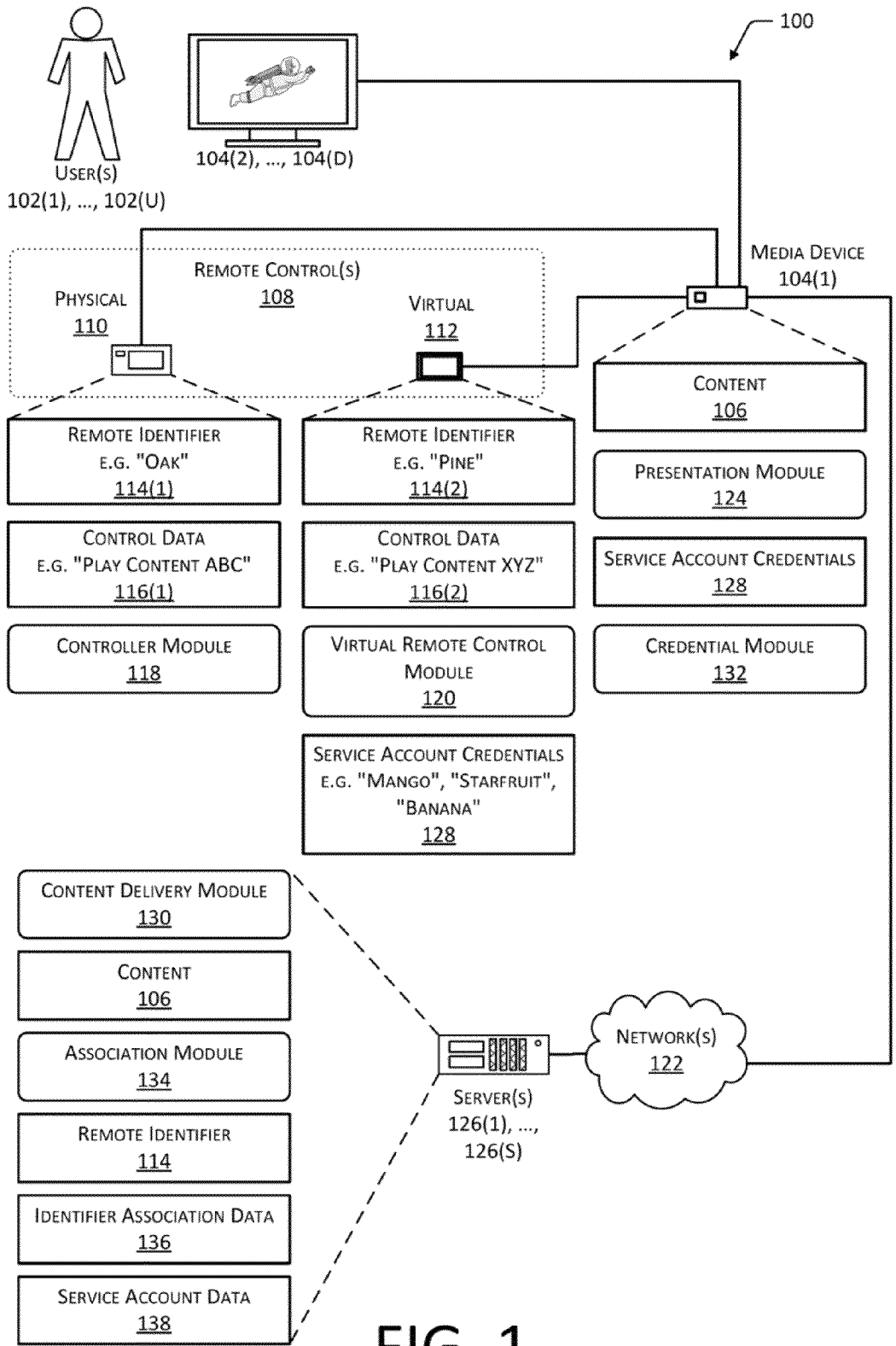
FIG. 1 is a system for distributing service credentials to a media device based on the use of a remote control.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content such as video, music, applications including games, and so forth may be consumed using a variety of media devices. These media devices may include televisions, set-top boxes, tablet computers, laptop computers, smartphones, desktop computers, media players, in-vehicle entertainment systems, and so forth. A user with a remote control may direct operation of the media devices. The remote control may be a physical remote control device, such as a handheld unit for use with the media device. The remote control may also be a virtual remote control, such as an application executing on another media device such as a smartphone or tablet. The remote control sends control data comprising commands which, when processed by the media device, direct operation. The media devices may be configured to communicate with one another or other devices, such as the remote controls, using one or more networks.

Content may be stored locally on the media device, or may be retrieved from servers using the one or more networks. Service account credentials allow for control over access to the content. For example, a user may have a subscription account with a service provider allowing content to be streamed from that service provider to the user's media device. The service account credentials may include a username and password or other data which allows the service provider to identify a particular account and provide access to content for that account.

The environment in which content consumption occurs continues to grow in terms of media devices used, service providers accessed, and so forth. Individual users, or groups of users such as a family, may have several user accounts with different service providers with corresponding service account credentials. The users may also access content from several different devices. Traditional systems have involved the user manually providing or provisioning media devices with these service account credentials. For example, upon acquiring a set-top box media device configured to stream content from the service provider, the user would need to manually engage in the provisioning process to associate the media device with each service provider they wish to use to establish the service account credentials. Continuing the example, upon acquiring a tablet media device, again the user would need to manually provision the service account credentials for that device. Manual provisioning is time intensive, may increase demands for end-user support to navigate the process, and may generally result in an adverse user experience. Furthermore, the issues presented with manual provisioning may discourage users from accessing content available through their accounts with service providers while at another location and using other media devices.

This disclosure describes systems and techniques for determining and using service account credentials ("credentials") without user intervention. In one implementation, the media device receives from the remote control a remote identifier which identifies the remote control device. The media device may then query a server using the remote identifier to retrieve the service account credentials which have been previously associated with the remote identifier. The server may return the service account credentials to the media device, which proceeds to use the credentials to access content. In another implementation, the remote control may store the service account credentials, and send the credentials to the media device. The media device may then use the credentials to access the content provided by the service provider. In some implementations the remote identifier, the service account credentials, or both may be included with transmission by the remote control of the control data to the media device. For example, a transmission from the remote control to the media device may comprise a packet which includes a header and a payload portion. The header may include the remote identifier while the payload may include control data and the service account credentials. The media device may be configured to transition from one set of credentials to another, corresponding to the remote identifier, service account credentials, or both which are received from different remote controls.

Association between the remote control and particular service account credentials may occur during fulfillment of an order for the remote control, or during fulfillment of an order which includes the remote control. In one implementation, an order for a physical remote control may result in storage and association of the remote identifier with a user account at a fulfillment center before shipment to the user. For example, a barcode scan of the remote identifier as printed on a box containing the physical remote control may be used as input and associated with the user account information associated with the login used to place the order. In another implementation, an order to install a virtual remote control application may result in acquisition and storage of a remote identifier, service account credentials, or both, as part of the software installation process on the media device.

Using these techniques, the user account and corresponding service account credentials are thus associated with particular remote control devices. Provisioning of the media device with the service account credentials occurs without manual intervention by the user. The user may thus easily control one or more media devices with their remote control, accessing content from one or more service providers as permitted by their service account credentials.

Illustrative System

FIG. 1 is a system 100 for distributing service credentials to a media device based on the use of a remote control. One or more users 102(1), 102(2), . . . , 102(U) may use one or more media devices 104(1), 104(2), . . . , 104(D). As used in this disclosure, letters in parenthesis such as "(D)" indicate an integer value. The media devices 104 may include televisions, tablet computers, personal computers, electronic book readers, gaming consoles, set-top boxes, media players, in-vehicle entertainment systems, smartphones, servers, and so forth. For example, the system 100 may include a set-top box media device 104(1) which is coupled to a television media device 104(2).

Content 106 may be consumed, processed, distributed, and so forth by the media devices 104. The content may include audio files, video files, electronic book ("eBook") files, and so forth. The content may also include application modules ("applications") such as games, word processors, and so forth. The content 106 may be downloaded or streamed from a service provider for consumption, processing, storage, and so forth on the media device 104.

One or more remote controls 108 may be used to direct operation of the media devices 104. The remote controls 108 may be physical remote control devices 110 or virtual remote control devices 112. The physical remote control 110 may comprise a dedicated device, such as an infrared or radio frequency (RF) remote control configured for handheld use. In some instances, the physical remote control 110 may be designed for use with a particular media device 104 or family of media devices 104. The physical remote control 110 may include various input and output devices such as buttons, touch sensors, accelerometers, microphones, speakers, and so forth. The virtual remote control device 112 may comprise a device configurable to execute a virtual remote control module. In some implementations the virtual remote control device 112 may comprise a media device 104.

The remote control 108 may store a remote identifier 114. The remote identifier 114 may comprise data which distinguishes one remote control 108 from another. The remote identifier 114 may be locally or globally unique. The remote identifier 114 may comprise information associated with a particular unit within the remote control 108. For example, the remote identifier 114 may comprise media access control ("MAC") address associated with a communication interface of the remote control 108, In another example, the remote identifier 114 may comprise a processor identifier associated with one or more hardware processors in the remote control 108, device serial number, and so forth. In some implementations the remote identifier 114 may be hardcoded such as with a programmable read only memory ("PROM") which may be loaded with the remote identifier 114 value such that subsequent changes to the value are not possible. In some implementations the remote identifier 114 may be stored in mutable memory, such that the value may be changed. For example, the remote identifier 114 may be stored in flash memory, magnetic storage, and so forth.

In some implementations the remote identifier 114 may be generated at least in part. For example, a portion of the remote identifier 114 may be static, while another portion is based on a cryptographic seed value configured to change in a deterministic way over time. The remote identifier 114 may be encrypted or otherwise be cryptographically secured.

The remote control 108 is configured to provide control data 116 to the media device 104 or another device. The control data 116 may include data or instructions configured to, when processed by a target device, affect operation of that device or another device. This may include configuring the media device 104, modifying presentation of content 106, and so forth. For example, the control data 116 may comprise navigational, playback and/or other types of instructions including those configured to turn the media device 104 on or off, change inputs, play content 106, pause presentation of content 106, and so forth.

The physical remote control device 110 may include a controller module 118, configured to generate the control data 116. The virtual remote control device 112 may execute a virtual remote control module 120. The physical remote control device 110 may be configured to include the remote identifier 114 with the control data 116. For example, upon activating a button on the remote control 108 to play content, the remote control 108 may transmit the remote identifier value and a command to play content.

The media devices 104 may couple to one or more networks 122. The networks 122 may include personal area networks ("PANs"), local area network(s) ("LANs"), wide area networks ("WANs"), and so forth. The networks 122 may be wired, wireless, or a combination and may support an access point topology, ad-hoc peer-to-peer topology, and so forth. For example, a LAN may be implemented using Ethernet, Wi-Fi™, Bluetooth®, Bluetooth® Low Energy, ZigBee®, and so forth. Within the system 100, several different LANs or WANs may coexist. For example, media devices 104(1) and 104(2) may be connected to one another using Wi-Fi™, while the media device 104(2) and 104(3) may be interconnected using Bluetooth®. The WAN may include private networks, public networks such as the Internet, or a combination thereof. Connections may be established between media devices 104 which are on the same or different LANs or WANs.

The media device 104 may include a presentation module 124. The presentation module 124 may be configured to provide various functions, such as presenting content 106, processing control data 116 from the remote controls 108, accessing content 106, and so forth. For example, the presentation module 124 may play video to a display device of the media device 104. The content 106 may be locally stored or retrieved from a remote location such as a server 126 accessible by way of the network 122.

One or more servers 126(1), 126(2), . . . , 126(S) may be operated by one or more entities and may provide various services. For example, a service provider may use servers 126 to deliver content 106 to the media device 104 for presentation. An online merchant may use servers 126 to sell remote controls 108 to the users 102.

Service account credentials 128 ("credential") may be used by a service provider or other party to maintain control over access to the content 106. The user 102 may have an associated user account which specifies particular content 106 which is available. For example, the user 102 may pay for a subscription with the service provider to access the content 106 by streaming for presentation on the media devices 104. To maintain this access, the user 102 may have credentials 128 associated with their particular user account. For example, the credentials 128 may include a username and password, a file containing an encrypted value, a string, hash value, and so forth. In some implementations the service account credentials 128 may comprise a use token or other information which is representative of the service account credentials 128. For example, a token may be provided which refers to stored service account credentials 128.

A content delivery module 130 executing on the server 126 may be configured to provide content 106 accessible to the server 126 to the media device 104 after providing valid credentials 128. For example, the presentation module 124 of the media device 104 may send credentials 128 and a request for content 106 to the content delivery module 130 of the server 126. The content delivery module 130 may determine validity of the credentials 128 and stream the requested content 106 to the media device 104.

Traditional systems involve the user 102 in manually entering the service account credentials 128. The system 100 as described in this disclosure allows for automatic provisioning of the credentials 128 to the media device 104. This automatic provisioning allows the user 102 to easily access content 106. This disclosure discusses at least two implementations for automatic provisioning. Variations or combinations on these implementations may also be employed.

In a first implementation, the remote control 108 provides the remote identifier 114 and the control data 116 to the media device 104. For example, the media device 104 may receive control data 116 by way of a Bluetooth® connection. A universally unique identifier ("UUID") value from the Bluetooth® connection may be used as the remote identifier 114. A credential module 132 executing on the media device 104 may determine that no credentials 128 are available for the remote identifier 114, and may send a request to the server 126. The request may include the remote identifier 114 value.

An association module 134 executing on the server 126 receives the request and the included remote identifier 114 value. Using the remote identifier 114, the association module 134 accesses identifier association data 136 to determine one or more user accounts associated with the remote identifier 114. For example, the user 102 may have user accounts with service provider "A", service provider "B", and service provider "C". The association module 134 may then access service account data 138 to determine credentials 128 associated with those user accounts. The association module 134 may then return the credentials 128 associated with the remote identifier 114 to the credential module 132 of the media device 104. In some implementations the credential module 132 may be configured to cache or store the remote identifier 114 and the corresponding credentials 128 for later use.

The presentation module 124 may then use the credentials 128 as received to access the content 106 and otherwise act on the control data 116 received from the remote control 108. The identifier association data 136 and the service account data 138 are discussed in more detail below with regard to FIG. 2.

In a second implementation, the remote control 108 may be configured to store the credentials 128 and provide those credentials 128 to the media device 104. For example, the virtual remote control device 112 may be configured to store the credentials 128 associated with several service providers. In this implementation, the virtual remote control module 120 may send the control data 116 and the credentials 128 to the media device 104. The media device 104 may then be configured to use the credentials 128 to access the content 106.

The remote control 108 may acquire the credentials 128 through one or more mechanisms. These mechanisms may include acquisition from a presentation module 124 installed on the remote control 108. For example, the virtual remote control device 112 may be configured to present content 106 and may have acquired the credentials 128 during installation of the presentation module 124. Another mechanism may include inclusion of the credentials 128 with an installation package used to install the virtual remote control module 120 on the virtual remote control device 112. In yet another mechanism, the user 102 may manually enter the credentials 128 using the remote control 108. Subsequent use of the remote control 108 to access other media devices 104, the servers 126, and so forth, serves to distribute the credentials 128 such that manual user input may be minimized to the single entry.

In the second implementation, the credential module 132 may store an association between the remote identifier 114 and the credentials 128 provided by the remote control 108. After transmission of the credentials 128 from the remote control 108 to the media device 104, subsequent transmissions of control data 116 may omit the credentials 128 and include the remote identifier 114. This may be done to reduce network traffic, minimize power consumption by the remote control 108 to transmit credentials 128 which have already been received, and so forth. As described above, the credential module 132 may cache the credentials 128 received from the remote control 108, and the remote identifier 114 associated therewith for subsequent use.

One or more of the remote identifier 114, the credentials 128, or the control data 116 may be encrypted or otherwise protected to minimize inadvertent distribution. In some implementations, the media device 104 may generate a hash of the remote identifier 114, and provide the hash to the server 126 for processing by the association module 134. In some implementations, transfer of the credentials 128 may involve a challenge and response, encrypted public/private keys, or other techniques to prevent inadvertent distribution of the credentials 128.

The service provider using the content delivery module 130 and the content 106 may operate using the same or different servers 126 than the association module 134. For example, online merchant "Z" may operate the servers 126 executing the association module 134, while service provider "A" operates the content delivery module 130. In some implementations, the association module 134 may be configured to provide data to the content delivery module 130. This data may include one or more of the remote identifier 114 or the credentials 128. For example, the association module 134 may determine the credentials 128, and provide the credentials 128 to the content delivery module 130. The content delivery module 130 may then receive and use the remote identifier 114 to access the credentials 128 and provide content 106.

Using the techniques described above, the media device 104 may be provisioned to use different credentials 128 free from user intervention. The media device 104 may readily be reconfigured from one set of credentials 128 to another, responsive to inputs from different remote controls 108. For example, a user 102(1) in a common area may use their physical remote 110 with the remote identifier "oak" to control the set-top box media device 104(1) which is coupled to a television media device 104(2) to present the video. When the user 102(1) presses the "home" button on the physical remote 110, the media device 104(1) acquires the credentials 128(1) associated with the user 102(1) and presents a list of content 106 associated with the user 102(1). Later, user 102(2) uses a smartphone executing the virtual remote control module 120 to activate a virtual "home" button. The media device 104(1) acquires the credentials 128(2) associated with the user 102(2). Using these credentials 128(2), the media device 104(1) presents a list of content 106 associated with the user 102(2).

Figure 2:
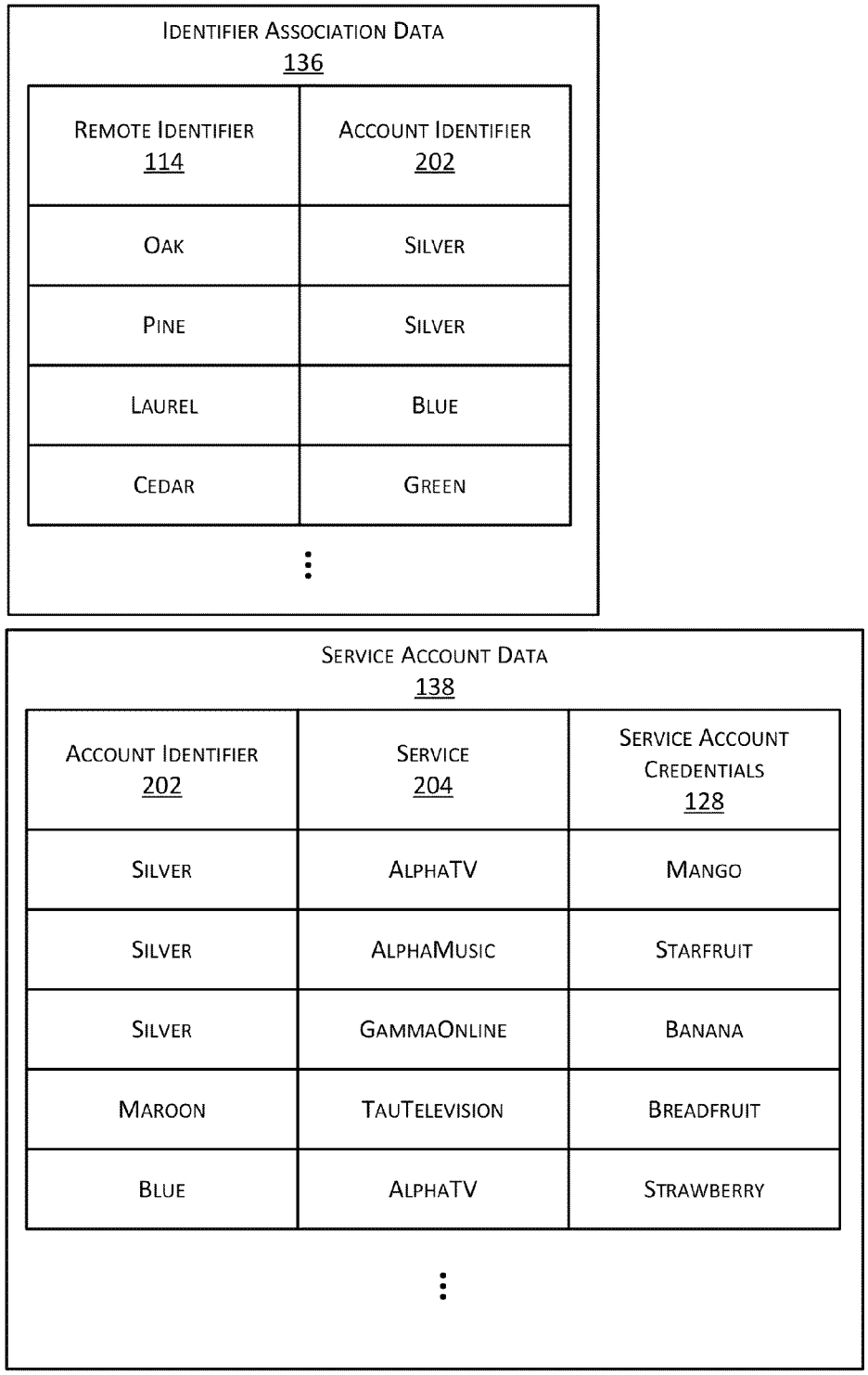
FIG. 2 is a block diagram of identifier association data and service account data which may be used to associate a particular remote control with service account credentials for a particular service, and account thereof.

FIG. 2 is a block diagram 200 of the identifier association data 136 and the service account data 138 which may be used to associate the remote identifier 114 of a particular remote control 108 with service account credentials 128 for a particular service. As described above, the identifier association data 136 provides an association or correspondence between the remote identifier 114 and an account identifier 202. The account identifier 202 provides data indicative of a particular user account, which may be associated with the user 102. For example, the account identifier 202 may comprise a string, binary value, and so forth. In this illustration, the remote identifier 114(1) comprising the string "oak" and the remote identifier 114(2) comprising the string "pine" are associated with the account identifier 202 "Silver". In some implementations a single remote identifiers 114 may be associated with a plurality of account identifiers 202. For example, a single remote control 108 may be associated with multiple accounts.

The service account data 138 provides an association or correspondence between the account identifier 202 and the credentials 128 for services 204. The service account data 138 allows for associations between a single user account and many services 204. The user account indicated by the account identifier 202 may be associated with several different services 204. The same service provider, or several service providers, may provide the services 204. For example, the user 102(1) having the account identifier 202 of "Silver" is shown here with access to the "AlphaTV" streaming video service 204 and a streaming music service "AlphaMusic", both from provider "A". The user 102 also has access to the gaming service 204 "GammaOnline" from provider "B".

As described elsewhere, the identifier association data 136 may be generated as part of a fulfillment process, such as when the remote control 108 is ordered from a user's 102 account. In other implementations, the identifier association data 136 may be entered manually or automatically. For example, manual entry may employ a user interface presented to the user 102 to receive information indicative of an association between the remote identifier 114 and a particular account identifier 202. In another example, automatic entry may include the use of one or more machine learning techniques or analysis of activity which has taken place on the media device 104. Continuing the example, the credential module 132 may determine that the remote identifier 114 comprising the string "Laurel" has been used to access one or more features available to the account identifier 202 "Blue", in particular accessing the service 204 "AlphaTV" with the service account credentials 128 "Strawberry". Based on this past usage, the identifier association data 136 and the service account data 138 may be automatically generated. In some situations, the user 102 may be provided with the user interface requesting confirmation of this association. For example, the user 102 may be asked if they wish to have the service account credentials 128 of "Strawberry" provided automatically during future use.

The association module 134 may use the identifier association data 136 and the service account data 138 to receive an inquiry from the remote control 108 or the media device 104. The inquiry may provide the remote identifier 114 and return the corresponding credentials 128. For example, the media device 104(1) may query the server 126 with the remote identifier 114(1) value of "Oak". The association module 134 accesses the identifier association data 136, and determines that the remote identifier 114(1) value of "Oak" is associated with the user account identifier 202 value of "Silver". The association module 134 may then access the service account data 138, and determine the account identifier 202 value "Silver" is associated with three services, "AlphaTV", "AlphaMusic", and "GammaOnline". The credentials 128 for these services are "Mango", "Starfruit", and "Banana", respectively. These credentials 128 may then be returned to the media device 104(1), for use in accessing the services provided by those service providers. Continuing the example, the control data 116(1) to "Play Content ABC" as provided by service provider "A" may result in a request to the servers 126 using the credentials 128 "Mango".

In some implementations the identifier association data 136, the service account data 138, or a portion thereof may be stored or cached on the media device 104, the remote control 108, and so forth. The credential module 132 may access this data and resolve the credentials 128 based on the remote identifier 114.

The data is depicted in this figure as tables for ease of illustration and not necessarily as a limitation. Other data structures may be used to store this information. These may include, but are not limited to, linked lists, scripts, program code, trees, and so forth.

Figure 3:
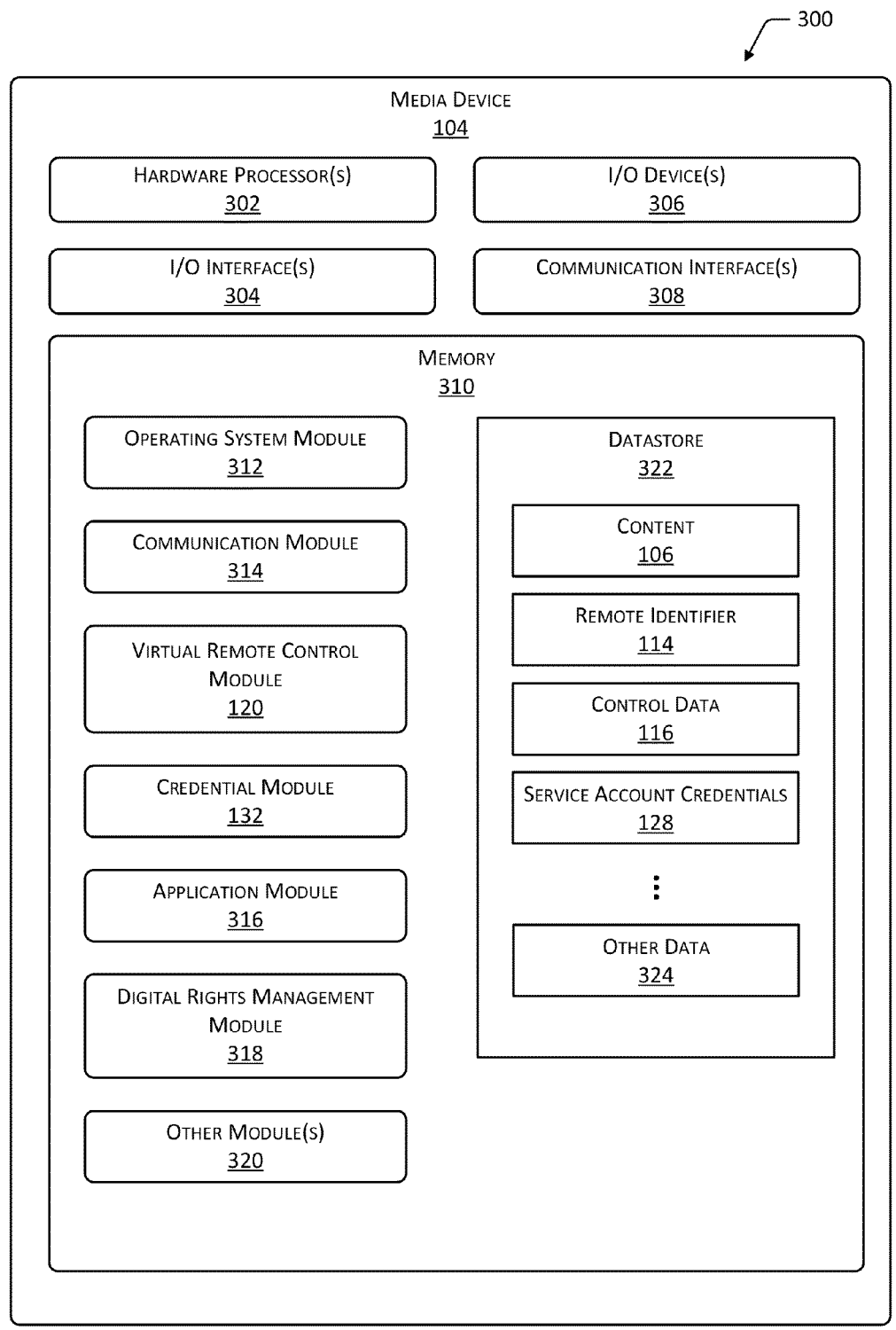
FIG. 3 illustrates a block diagram of the media device.

FIG. 3 illustrates a block diagram 300 of the media device 104. The media device 104 may include one or more hardware processors 302 ("processors") configured to execute one or more stored instructions. The processors 302 may comprise one or more cores. The media device 104 may include one or more input/output ("I/O") interface(s) 304 to allow the processor 302 or other portions of the media device 104 to communicate with other devices. The I/O interfaces 304 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK as promulgated by Toshiba Corp., analog video, analog audio, IEEE 3394 as promulgated by the Institute for Electrical and Electronics Engineers, and so forth.

The I/O interface(s) 304 may couple to one or more I/O devices 306. The I/O devices 306 may include input devices such as one or more of a camera, a microphone, a touch sensor, a button, range camera, fingerprint reader, accelerometer, gyroscope, magnetometer, tilt sensor, and so forth. The I/O devices 306 may also include output devices such as one or more of a display, audio speakers, haptic output device and so forth. In some embodiments, the I/O devices 306 may be physically incorporated with the media device 304 or may be externally placed.

The media device 104 may also include one or more communication interfaces 308. The communication interfaces 308 are configured to provide communications between the media device 104 and other devices, such as other media devices 104, routers, access points, the servers 126, and so forth. The communication interfaces 308 may be configured to couple wired or wirelessly to one or more PANs, LANs, WANs, personal area networks, and so forth. For example, the communication interfaces 308 may include Ethernet, Wi-Fi™, Bluetooth®, ZigBee, and so forth.

The media device 104 may also include one or more busses or other internal communications hardware or software that allow for the transfer of data between the various modules and components of the media device 104.

As shown in FIG. 3, the media device 104 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 310 provides storage of computer readable instructions, data structures, program modules and other data for the operation of the media device 104.

The memory 310 may include at least one operating system ("OS") module 312. The OS module 312 is configured to manage hardware resource devices such as the I/O interfaces 304, the I/O devices 306, the communication interfaces 308, and provide various services to applications or modules executing on the processors 302. The OS module 312 may implement a variation of the Linux operating system, such as Android® as promulgated by Google, Inc. Other OS modules 312 may be used, such as the iOS operating system from Apple, Inc. of Cupertino, Calif., the Windows® operating system from Microsoft Corporation of Redmond, Wash., the LynxOS® from LynuxWorks of San Jose, Calif., and so forth.

Also stored in the memory 310 may be one or more of the following modules. These modules may be executed as foreground applications, background tasks, daemons, and so forth.

A communication module 314 may be configured to participate in discovery of other devices and services they support or provide, exchange information, and so forth. For example, the communication module 314 may detect and establish communications with the remote control(s) 108. The communication module 314 may provide a framework for establishing and using connections with the other media devices 104. The connections may be authenticated, encrypted, and so forth. The communication module 314 may include one or more transport modules. The transport modules are configured to provide functionality at a transport layer and establish and maintain communication channels that transfer bits from one device to another. The communication module 314 may have multiple transport modules available contemporaneously. The functionality provided by the communication module 314 may be provided free from user intervention. For example, setup of transports, exchange of remote identifiers 114, control data 116, credentials 128, and so forth, may occur without receiving user input.

The virtual remote control module 120 is configured to execute on the processor 302 and operate as a remote control for one or more devices, such as the media devices 104. The virtual remote control module 120 may be configured to present a user interface, receive one or more user inputs using the input devices, generate at least a portion of the remote identifier 114, generate the control data 116, and so forth. The virtual remote control module 120 may use the communication module 314 to send or receive the remote identifier 114, the control data 116, the credentials 128, and so forth.

The credential module 132 is configured to retrieve the service account credentials 128 from the server 126, receive the service account credentials 128 from the remote control 108, or retrieve previously stored or cached service account credentials 128. As described above, the credential module 132 may retrieve the service account credentials based at least in part on the remote identifier 114.

One or more of the application modules 316 may be stored in the memory 310. The one or more application modules 316 provide functionality which is interactive with, or provides information to, the user 102. For example, an application module 316 may be a game which is playable by the user 102, a content player application for presenting content 106, and so forth.

A digital rights management module 318 may provide support for presenting or processing content 106 which is protected using one or more digital rights management schemes. Other modules 320 may also be present.

The memory 310 may also include a datastore 322 to store information. The datastore 322 may use a flat file, database, linked list, tree, executable code, script, or other data structure to store the information. In some implementations, the datastore 322 or a portion of the datastore 322 may be distributed across one or more other devices including servers 126, other media devices 104, network attached storage devices, and so forth.

The datastore 322 may store the content 106, or a portion thereof. The datastore 322 may also store the remote identifier 114 associated with the media device 104. For example, the media device 104 may use the remote identifier 114 during operation of the virtual remote control module 120. In some implementations the remote identifier 114 may be based at least in part on biometric information associated with the user 102. For example, the remote identifier 114 may be based on a hardware address associated with the communication interface 308 as well as information about the user's 102 fingerprint.

The datastore 322 may also store the remote identifiers 114 received from the remote controls 108, control data 116, credentials 128, and so forth. The datastore 322 may store other data 324 as well, such as user preferences, configuration files, and so forth.

Figure 4:
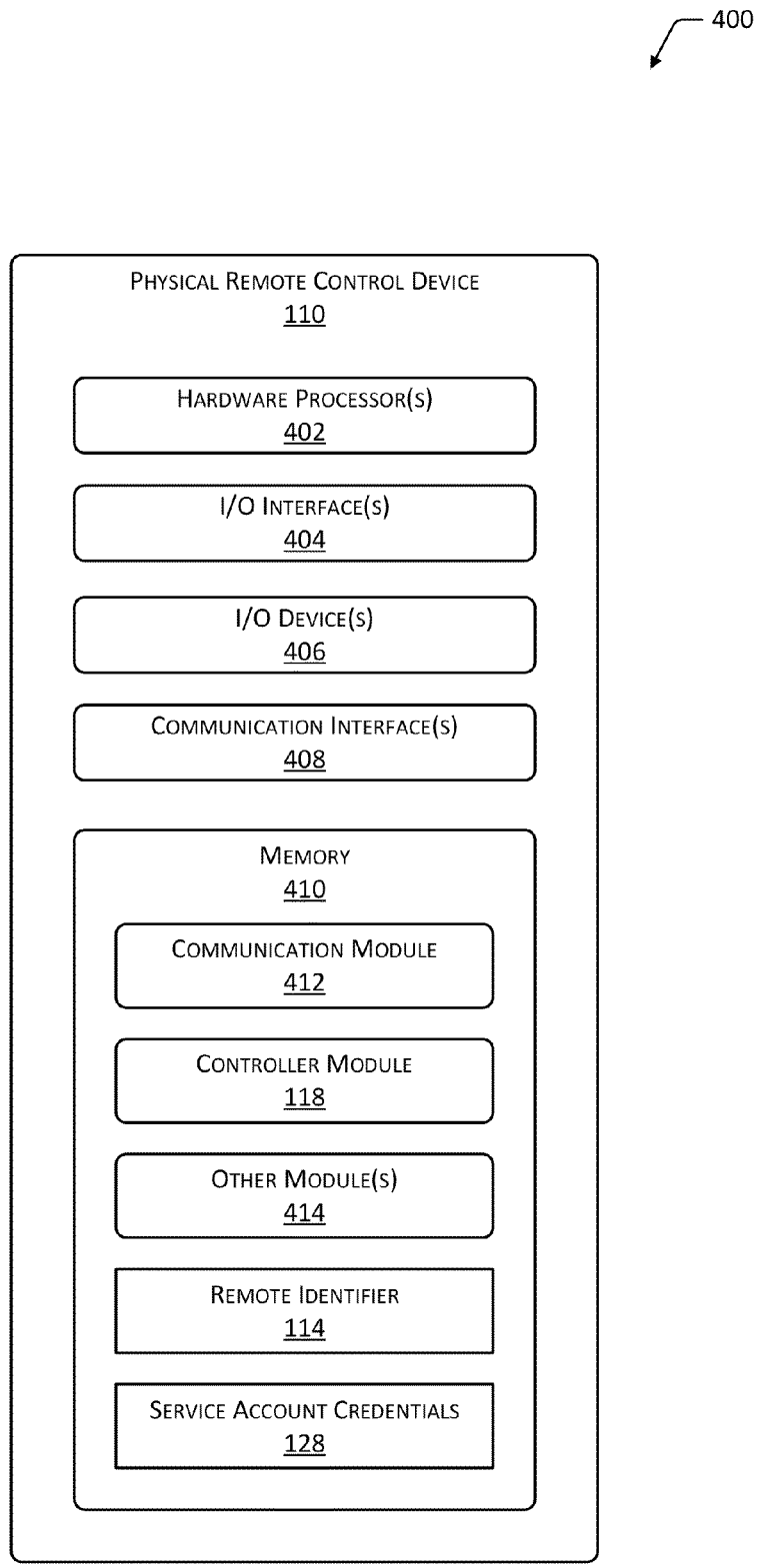
FIG. 4 illustrates a block diagram of a remote control device configured to provide a remote identifier, service account credentials, or both, to the media device.

FIG. 4 illustrates a block diagram 400 of the physical remote control device 110. The physical remote control 110 may comprise a dedicated device, such as an infrared or radio frequency (RF) remote control configured for handheld use. In some instances, the physical remote control 110 may be designed for use with a particular media device 104 or family of media devices 104. In others, the physical remote control 110 may be configurable for use with different media devices 104.

The physical remote control device 110 may include one or more hardware processors 402 ("processors") configured to execute one or more stored instructions. The processors 402 may comprise one or more cores. In some implementations the processors 402 may comprise microcontrollers, application specific integrated circuits ("ASICs"), and so forth.

The physical remote control device 110 may include one or more I/O interface(s) 404 to allow the processor 402 or other portions of the physical remote control device 110 to communicate with other devices. The I/O interfaces 404 may comprise I2C, SPI, USB as promulgated by the USB Implementers Forum, RS-232, and so forth.

The I/O interface(s) 404 may couple to one or more I/O devices 406. The I/O devices 406 may include input devices such as one or more of a camera, a microphone, a touch sensor, a button, accelerometer, gyroscope, magnetometer, tilt sensor, and so forth. The I/O devices 406 may also include output devices such as one or more of a light, a display, audio speakers, haptic output device and so forth. In some embodiments, the I/O devices 406 may be physically incorporated with the physical remote control device 110 or may be externally placed.

The physical remote control device 110 may also include one or more communication interfaces 408. The communication interfaces 408 are configured to provide communications between the physical remote control device 110 and other devices, such as the media devices 104, routers, access points, the servers 126, and so forth. The communication interfaces 408 may include wireless interfaces, such as Wi-Fi™, Bluetooth®, ZigBee, and so forth.

As shown in FIG. 4, the physical remote control device 110 includes one or more memories 410. The memory 410 comprises one or more CRSM. The CRSM may be any one or more of an electronic storage medium, a magnetic storage medium, an optical storage medium, a quantum storage medium, a mechanical computer storage medium and so forth. The memory 410 provides storage of computer readable instructions, data structures, program modules and other data for the operation of the physical remote control device 110.

The memory 410 may include a communication module 412. The communication module 412 may be configured to participate in discovery of devices, exchange information, and so forth. The communication module 412 may provide a framework for establishing and using connections with the other devices such as the media devices 104 or other remote controls 108. The connections may be authenticated, encrypted, and so forth. The communication module 412 may include one or more transport modules. The transport modules are configured to provide functionality at a transport layer and establish and maintain communication channels that transfer bits from the physical remote control device 110 to the media devices 104, the servers 126, or another device. The communication module 412 may have multiple transport modules available contemporaneously.

The controller module 118 is configured to accept user input from the I/O devices 406. Based on this input, the controller module 118 generates control data 116 and communicates the control data 116 to the media device 104 using the communication module 412. In some implementations the controller module 118 may receive data from another device such as the media device 104 or the server 126 and present output to the user, such as audio from a speaker, illuminating a light, presenting information on a display, and so forth.

Other modules 414 may be present in the memory, such as a biometric authentication module configured to acquire biometric information about the user 102. For example, the biometric authentication module may acquire and compare a fingerprint.

The memory 410 may also store the remote identifier 114. As described above, in some implementations the remote identifier 114 may be hardcoded or stored in write-one memory, such as a PROM. The memory 410 may also store the service account credentials 128. The credentials 128 may be acquired from the user's 102 input to the I/O devices 406, or may be received from another device, such as from the media device 104, another remote control 108, the server 126, and so forth.

Figure 5:
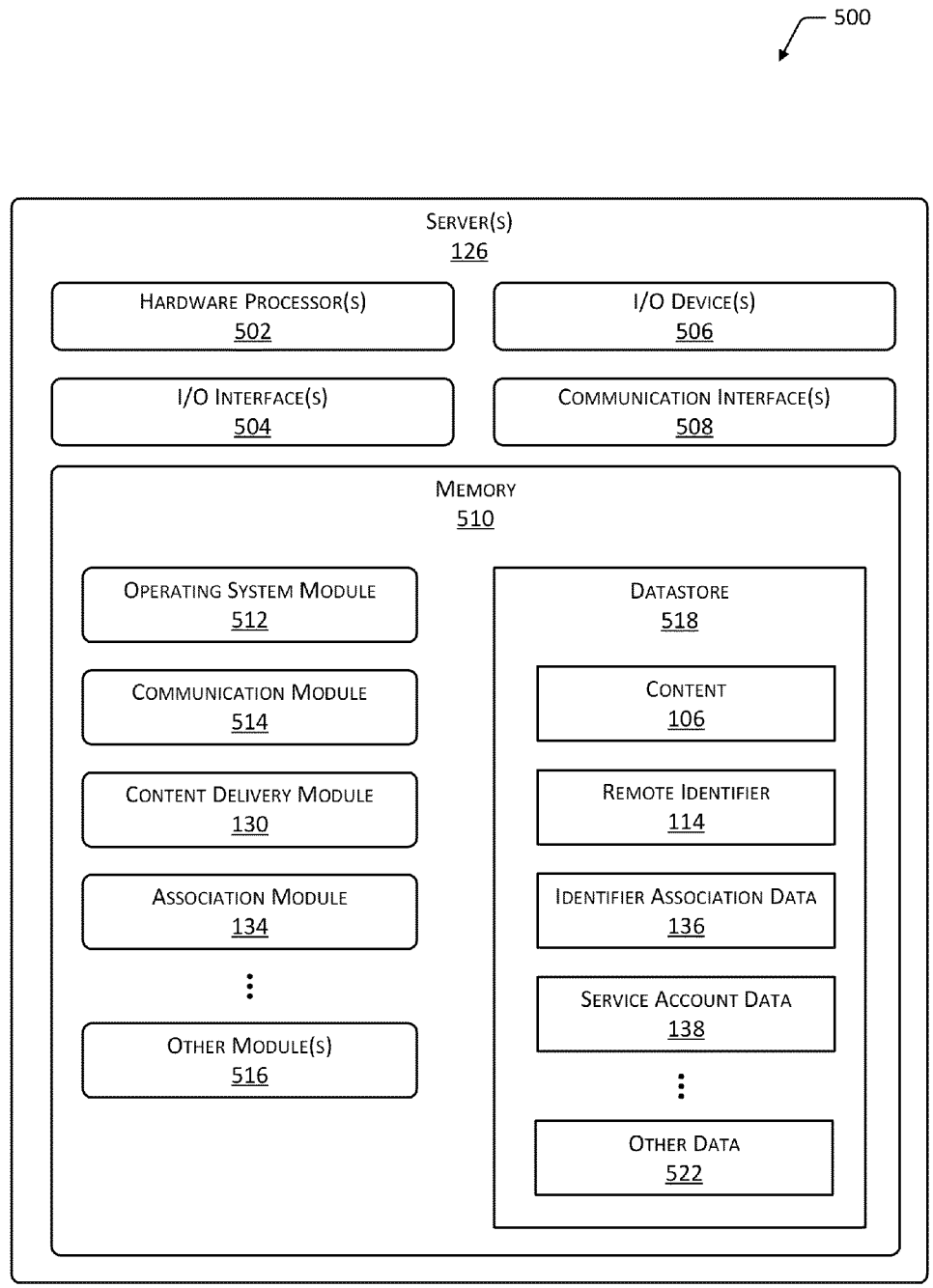
FIG. 5 illustrates a block diagram of a server configured to associate a remote identifier with service account credentials.

FIG. 5 illustrates a block diagram 500 of the server 126 configured to associate a remote identifier 114 with service account credentials 128, provide content 106, or provide other services. As described above, one or more service providers using one or more servers 126 may deliver the content 106, distribute credentials 128, and so forth. The functions provided by the server 126 may be distributed across one or more physical or virtual devices.

The server 126 may include one or more processors 502 configured to execute one or more stored instructions. The processors 502 may comprise one or more cores. The server 126 may include one or more I/O interface(s) 504 to allow the processor 502 or other portions of the server 126 to communicate with other devices. The I/O interfaces 504 may comprise I2C, SPI, USB, RS-232, and so forth.

The I/O interface(s) 504 may couple to one or more I/O devices 506. The I/O devices 506 may include input devices such as one or more of a keyboard, mouse, scanner, and so forth. The I/O devices 506 may also include output devices such as one or more of a display, audio speakers, and so forth. In some embodiments, the I/O devices 506 may be physically incorporated with the media device 104 or may be externally placed.

The server 126 may also include one or more communication interfaces 508. The communication interfaces 508 are configured to provide communications between the server 126 and other devices, such as the media devices 104, routers, access points, and so forth. The communication interfaces 508 may be configured to communicate with the network 122, including PANs, LANs, WANs, and so forth.

The server 126 may also include one or more busses or other internal communications hardware or software that allow for the transfer of data between the various modules and components of the server 126.

As shown in FIG. 5, the server 126 includes one or more memories 510. The memory 510 comprises one or more CRSM as described above. The memory 510 provides storage of computer readable instructions, data structures, program modules and other data for the operation of the media device 104.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variation of the Linux operating system as promulgated by Linus Torvalds, the Windows® Server operating system from Microsoft Corporation of Redmond, Wash., and so forth.

Also stored in the memory 510 may be one or more of the following modules. These modules may be executed as foreground applications, background tasks, daemons, and so forth.

A communication module 514 may be configured to establish communications with one or more of the remote controls 108, the media devices 104, other servers 126, or other devices. The communications may be authenticated, encrypted, and so forth.

The memory 510 may store the content delivery module 130. As described above, the content delivery module 130 may be configured to provide the content 106 to the media device 104. Distribution of the content 106 may be based at least in part on the receipt of valid credentials 128. The content delivery module 130 may determine validity of the credentials 128. For example, the received credentials 128 may be compared with previously stored credentials 128. In another example, the credentials 128 may be subjected to one or more cryptographic processes to authenticate. The content delivery module 130 may be configured to stream the content 106, transfer content 106 files, and so forth.

The association module 134 may also be stored in the memory 510. As described above, the association module 134 is configured to accept a remote identifier 114 as input and return corresponding credentials 128. In some implementations the association module 134 may accept other inputs to use in returning the corresponding credentials 128. For example, other information about the user 102 acquired from the remote control 108 may be used to disambiguate between two users 102, each with different account identifiers 202, which share a remote control 108. Continuing the example, the disambiguation may be based on biometric data, cadence of user input on the remote control 108, and so forth.

In some implementations the association module 134 may be configured to generate the identifier association data 136, the service account data 138, or both. For example, the association module 134 may interact with an order processing system to receive information about orders for remote controls 108. This may include orders for individual remote controls 108, or orders for items or assemblies which include remote controls 108. Information indicative of the user 102, and corresponding account identifier 202 for that user, and the remote identifier 114 of the purchased device may be used to automatically generate the identifier association data 136. For example, the user 102 may have a user account with the account identifier 202 of "Silver". The user 102 purchased from entity "A" the physical remote control device 110 which has the remote identifier 114(1). A barcode on the box which encodes the remote identifier 114(1) of "Oak" for the physical remote control device 110 within is scanned during preparations for shipment to the user 102. The account identifier 202 of "Silver" and the corresponding remote identifier 114(1) are provided to the association module 134. The association module 134 may then populate or update the appropriate entries within the identifier association data 136.

With regards to the distribution or installation of the virtual remote control module 120, the remote identifier 114 may be retrieved from the device installing the module, or may be assigned thereto. For example, a Bluetooth® identifier may be retrieved from the virtual remote control device 112 before, during, or after installation of the virtual remote control module 120. In another example, the remote identifier 114 may be generated and provided to the virtual remote control device 112 for use by the virtual remote control module 120.

The association module 134 may also interact with the content delivery module 130 to retrieve information to populate the service account data 138. For example, the association module 134 may request the service(s) 204 and the associated credentials 128 for the account identifier 202 "Silver". The association module 134 may then populate or update the appropriate entries within the service account data 138.

Other modules 516 may also be present in the memory 510. For example, a digital rights management module may provide support for delivering content 106 protected using one or more digital rights management schemes to the media devices 104.

The memory 510 may also include a datastore 518 to store information. The datastore 518 may use a flat file, database, linked list, tree, executable code, script, or other data structure to store the information. In some implementations, the datastore 518 or a portion of the datastore 518 may be distributed across one or more other devices including other servers 134, network attached storage devices and so forth.

The datastore 518 may store the content 106, the remote identifiers 114 from the remote controls 108, the identifier association data 136, the service account data 138, and so forth. The datastore 518 may store other data 522 as well, such as user preferences, configuration files, other types of content, and so forth.

Illustrative Processes

Figure 6:
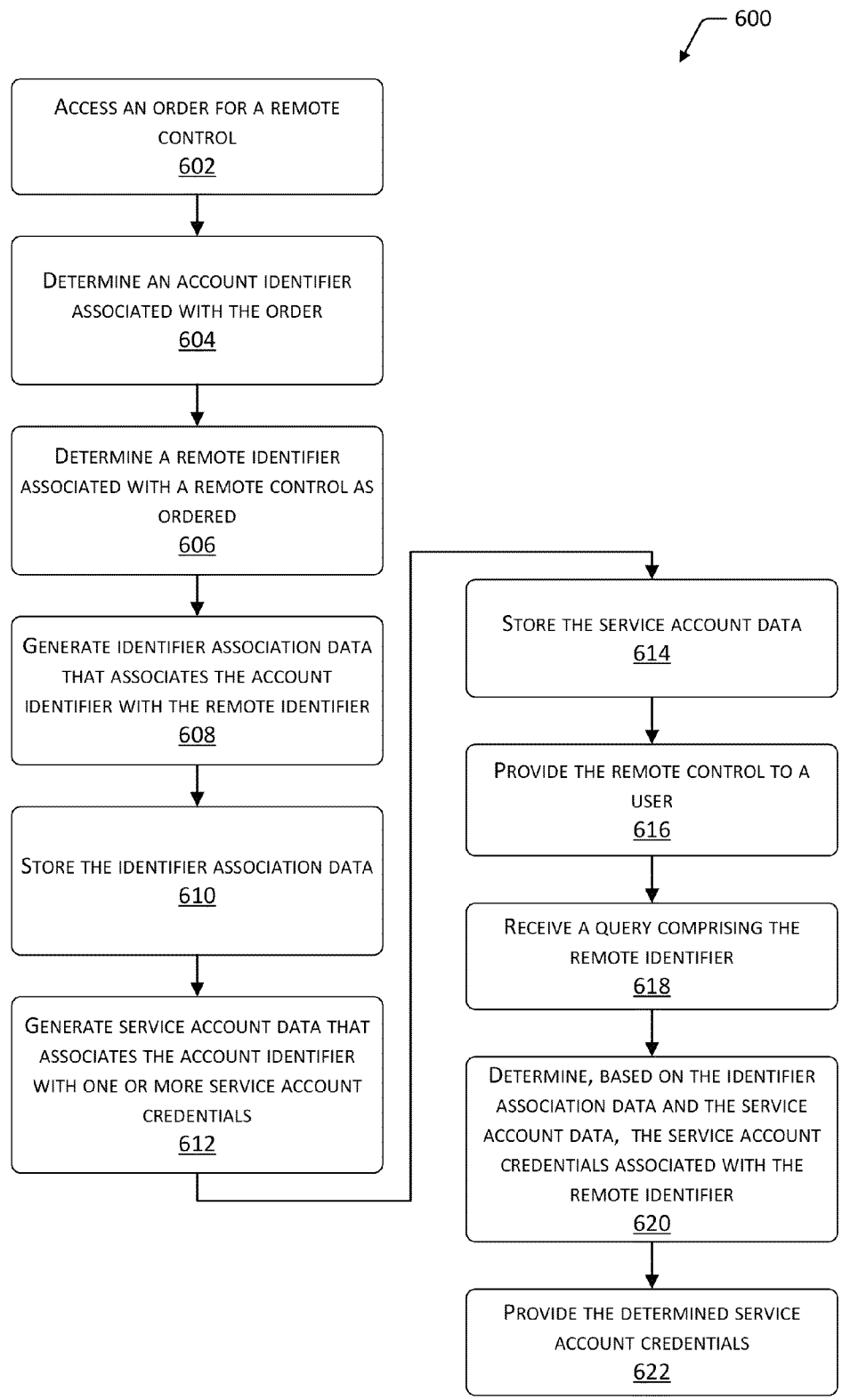
FIG. 6 illustrates a flow diagram of a process of associating a remote control with service account credentials.

FIG. 6 illustrates a flow diagram 600 of a process of associating a remote control 108 with service account credentials 128. This process may be performed by the association module 134.

Block 602 accesses an order including a remote control 108. For example, the user 102 may have placed an order using an online merchant for the physical remote control 110, the virtual remote control 112, for a media device 104 which includes a remote control 108, and so forth. As described above, the virtual remote control 112 may comprise an application or module such as the virtual remote control module 120, configured for execution on the processor 402. With regards to the virtual remote control 112, the order may comprise a request for electronic delivery of the application.

Block 604 determines an account identifier 202 associated with the order. For example, the online merchant may access the user account records used to place the order.

Block 606 determines a remote identifier 114 associated with a remote control 108 as ordered. The determination may comprise acquiring the remote identifier 114 during packing and preparation for shipment of the physical remote control device 110. For example, acquisition may be done using a scanner retrieving information from an optical tag, a radio frequency identification ("RFID") tag, manual entry, and so forth.

Block 608 generates identifier association data 136 that associates the account identifier 202 with the remote identifier 114. For example, the association may be generated which relates the account identifier 202 used to order the remote control 108 with the remote control 108 sent for delivery to the user 102.

Block 610 stores the identifier association data 136 that associates the account identifier 202 and the remote identifier 114. For example, a row may be created in the identifier association data 136 which relates the user 102(1) having account identifier 202 of "Blue" with the remote identifier 114 of "Laurel". As information changes, the identifier association data 136 may be updated.

Block 612 generates service account data 138 that associates the account identifier 204 with service account credentials 128. This association may be based on information received from the user 102, information retrieved from other systems, and so forth. For example, the association module 134 may receive information about the services 204 and credentials 128 associated with a particular account identifier 202.

Block 614 stores, as service account data 138, the association between the account identifier 202 and the one or more service account credentials 128. Once stored, the service account data 138 may be used as described above. As information changes, the service account data 138 may be updated.

Block 616 provides the remote control 108 to the user 102. For example, the physical remote control device 110 may be physically delivered to the user 102, or the virtual remote control module 120 may be downloaded and installed on the media device 104 which will be configured to act as a virtual remote control 112.

Block 618 receives a query comprising the remote identifier 114. For example, the media device 104 may send the query to determine the credentials 128 associated with the remote identifier 114.

Block 620 determines the service account credentials 128 associated with the remote identifier 114. As described above, this may include referencing information in the identifier association data 136 and the service account data 138.

Block 622 provides the service account credentials 128. For example, the server 126 may send the credentials 128 to the media device 104 which sent the query.

Figure 7:
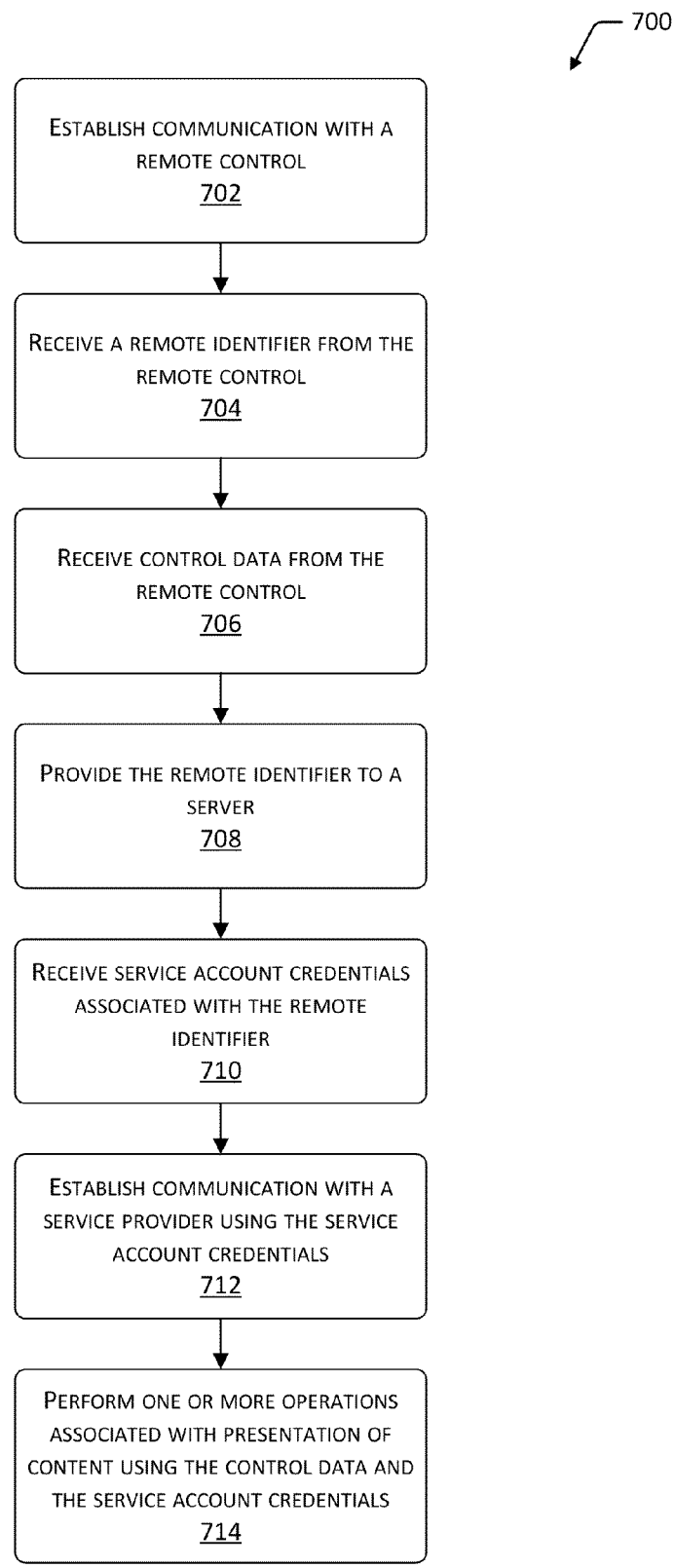
FIG. 7 illustrates a flow diagram of a process of the media device determining service account credentials based on the remote identifier.

FIG. 7 illustrates a flow diagram 700 of a process of the media device 104 determining service account credentials 128 based on the remote identifier 114. This process may be performed at least in part by the credential module 132.

Block 702 establishes communication with a remote control 108. For example, the media device 104 and the remote control device 108 may establish a Bluetooth®, Wi-Fi™, Wi-Fi™ direct connection, and so forth. The remote control 108 may be a physical remote control device 110 or a virtual remote control device 112.

Block 704 receives a remote identifier 114 from the remote control 108. For example, the remote identifier 114(2) "Pine"

may be received. As described above, the remote identifier 114 may comprise a universally unique identifier ("UUID") value associated with a communication interface of the remote control 108. In some implementations, the remote identifier 114 may be decrypted.

Block 706 receives control data 116 from the remote control 108. As described above, the control data 116 is indicative of one or more user inputs to the remote control 108. In some implementations, the remote identifier 114 and the control data 116 may be combined into a single transmission, single packet, single data structure, and so forth. For example, the remote identifier 114 may be prepended to the control data 116 prior to transmission.

Block 708 provides the remote identifier 114 to the server 126. In another implementation, previously received remote identifiers 114 and corresponding credentials 128 have been cached. The process may use the cached credentials 128 and proceed to block 712, omitting block 708 and 710.

Block 710 receives the service account credentials 128 associated with the remote identifier 114. As described above, the association module 134 of the server 126 may return the credentials 128. As also described above, the credentials 128 are configured to convey permission to access content 106 available with regard to a particular service 204. The credentials may comprise encrypted data, or information otherwise cryptographically protected.

As described above, the remote identifier 114 may be associated with one or more services 204 offered by one or more service providers. For example, a single remote control 108 may be associated with six services from six different service providers.

In some implementations, the remote identifier 114, the credentials 128, and the association there between may be stored or cached for future use. In some implementations, this cached data may expire.

Block 712 establishes communication with the service provider using the service account credentials 128. For example, the media device 104 may contact the server 126 using the credentials 128, or information derived therefrom. As described above, the service provider is configured to provide access to the content 106 based on credentials 126.

Block 714 performs one or more operations associated with the presentation of the content 106 using the control data 116 and the credentials 128. The one or more operations associated with presentation of content 106 may include one or more of: retrieving a list of content 106 associated with the service account credentials 128; initiating streaming of the content 106; stopping or pausing presentation of the content 106; transitioning from a first presentation point in the content to a second presentation point in the content 106, and so forth. For example, the control data 116 may request the content 106 from the service provider, which may subsequently be received from the service provider.

In some implementations, data indicating validity of the service account credentials 128 with respect to the content 106 may be received. For example, the content delivery module 130 may report back as to whether the credentials 128 remain valid, duration of that validity, and so forth.

Figure 8:
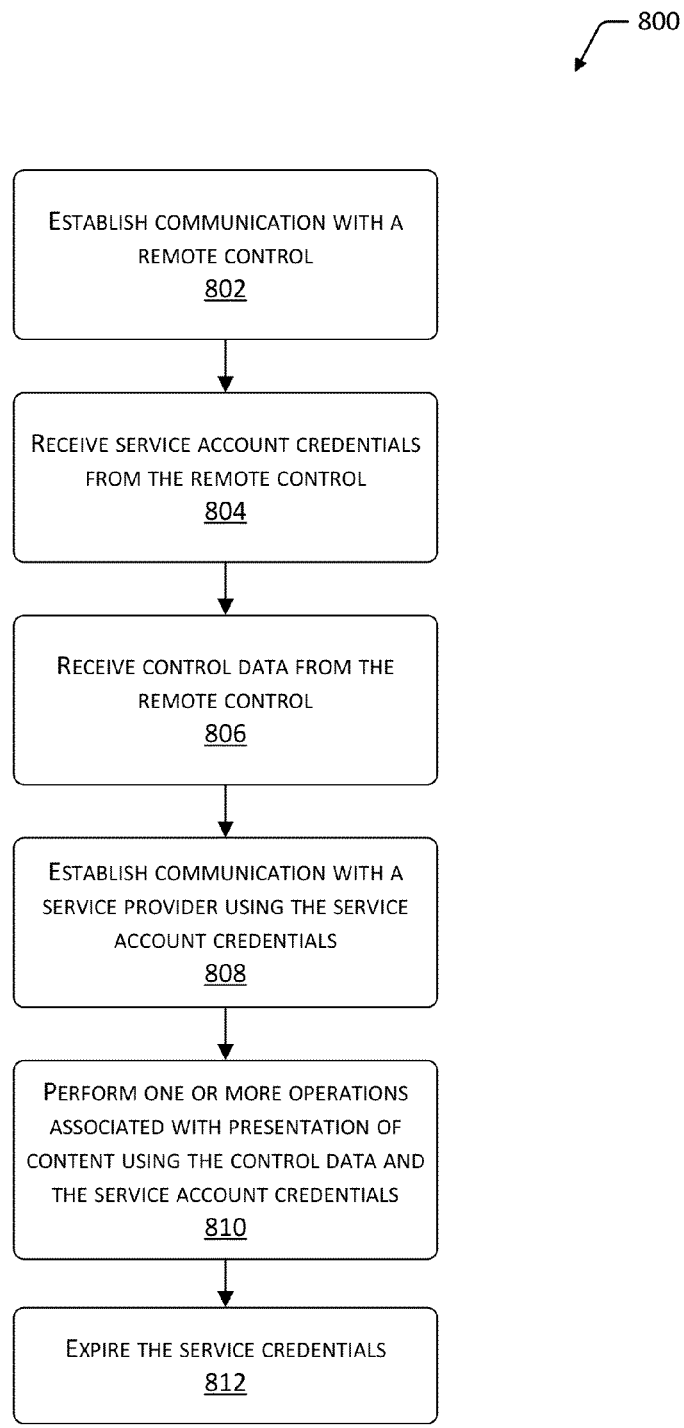
FIG. 8 illustrates a flow diagram of a remote control providing service account credentials to the media device.

FIG. 8 illustrates a flow diagram 800 of a remote control 108 providing service account credentials 128 to the media device 104. This process may be performed at least in part by the presentation module 124.

Block 802 establishes communication with a remote control 108. For example, the media device 104 and the remote control device 108 may establish a Bluetooth®, Wi-Fi™, Wi-Fi™ direct connection, and so forth. The remote control 108 may be a physical remote control device 110 or a virtual remote control device 112.

Block 804 receives service account credentials 128. As described above, in some implementations the remote control 108 stores at least a portion of the credentials 128. As also described above, the credentials 128 are configured to convey permission to access content 106 available with regard to a particular service 204. As described above, the credentials 128 may comprise encrypted data, or information otherwise cryptographically protected. The service account credentials 128 may be transmitted to the media device 104 within a payload section of a packet from the remote control 108.

In some implementations, the remote identifier 114 may also be received by the media device 104. The remote identifier 114 may be transmitted to the media device 104 within a header section of the packet from the remote control 108. For example, the remote identifier 114 may be the device or network address of the remote control 108. In other implementations, the service account credentials 128 and the remote identifier 114 may both be transmitted in the payload of a packet.

Block 806 receives control data 116 from the remote control 108. As described above, the control data 116 is indicative of one or more user inputs to the remote control 108. In some implementations, the control data 116 and the credentials 128 may be combined into a single transmission, single packet, single data structure, and so forth. For example, the credentials 128 may be prepended to the control data 116 prior to transmission. In some implementations the remote identifier 114 may also be included in the credentials 128. As described above, in some implementation the remote identifier may comprise a universally unique identifier ("UUID") value, such as associated with a communication interface.

In some implementations the control data 116 may be omitted. For example, default control data 116 may be stored on the media device 104 and associated with receipt of the credentials 128. Responsive to receipt of the credentials 128, the stored control data 116 may be accessed and the corresponding action performed. Continuing the example, the credentials 128 may be based at least in part on information exchanged during a pairing process between the remote control 108 and the media device 104 using a Bluetooth connection. Once the pairing is complete, stored control data 116 associated with activating a particular user interface for a service provider may be executed automatically.

Block 808 establishes communication with the service provider using the service account credentials 128. For example, the media device 104 may contact the server 126 using the credentials 128, or information derived therefrom. As described above, the service provider is configured to provide access to the content 106 based on credentials 128.

Block 810 performs one or more operations associated with the presentation of the content 106 using the control data 116 and the credentials 128. The one or more operations associated with presentation of content 106 may include one or more of: retrieving a list of content 106 associated with the service account credentials 128; initiating streaming of the content 106; stopping or pausing presentation of the content 106; transitioning from a first presentation point in the content 106 to a second presentation point in the content 106, and so forth. For example, the control data 116 may request the content 106 from the service provider. The content 106 may subsequently be received from the service provider.

In some implementations, data indicating validity of the service account credentials 128 with respect to the content 106 may be received. For example, the content delivery module 130 may report back as to whether the credentials 128 remain valid, duration of that validity, and so forth.

Block 812 may expire the service account credentials 128. For example, the credentials 128 may be usable for a predetermined period of time, or set of content 106 access functions, after which they may be deemed unavailable for use. For example, the credentials 128 may be designated as unavailable after a time period during which no further control data 116 is received and the one or more operations are concluded. In one implementation, the credentials 128 may be unavailable in that they are no longer valid for use with the service provider or may have otherwise expired. Continuing the example, if the user 102 provides no further input for the period of time and the content 106 finishes presentation, the credentials 128 may expire on the media device 104. Once expired, the credentials 128 may be removed from the memory 310 of the media device 104. As a result, the credentials 128 may need to be obtained again.

In another implementation, use of the previously acquired credentials 128 may be discontinued based on subsequent receipt of additional credentials 128. For example, new credentials 128 may replace the old. In comparison with the unavailable credentials 128, the discontinued credentials 128, may still remain available and valid for subsequent use with the service provider. For example, the previously acquired credentials 128 may be stored in the memory 310 for future use.

Figure 9:
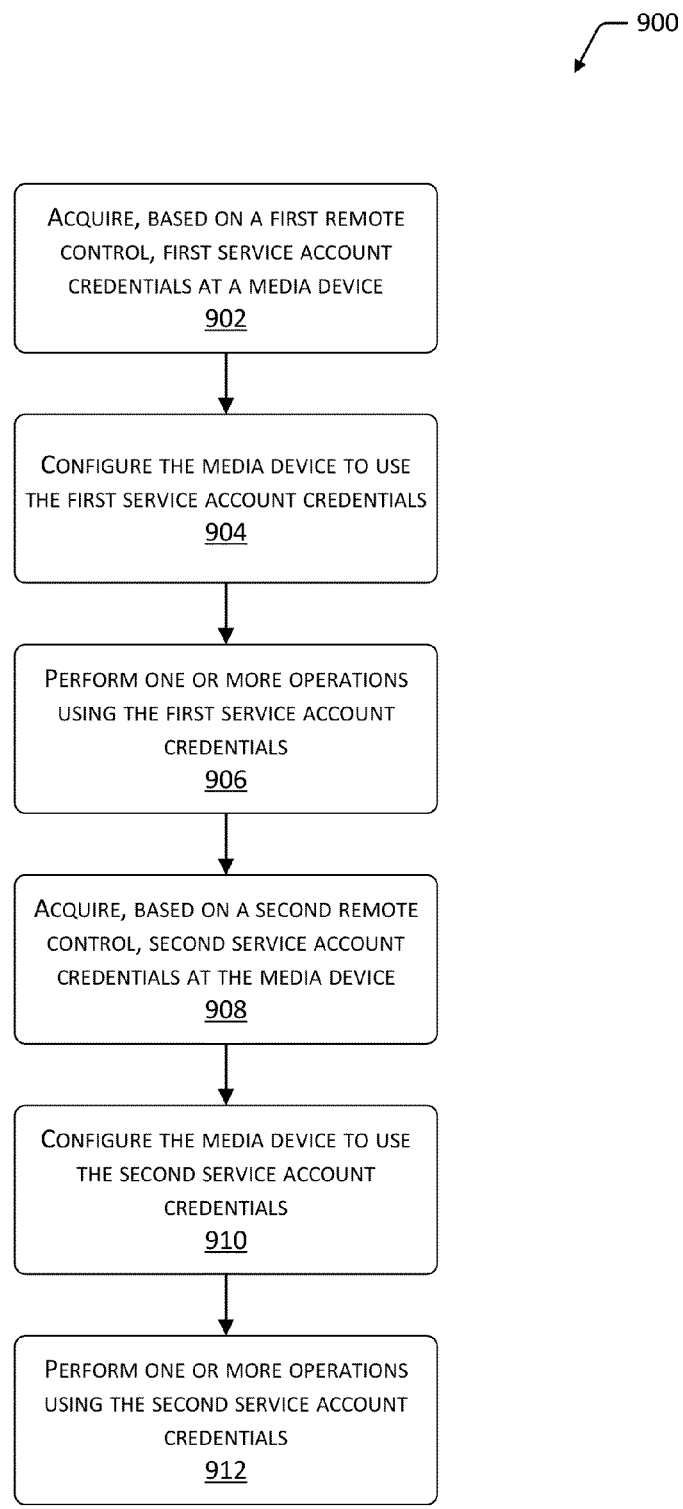
FIG. 9 illustrates a flow diagram of the media device transitioning from using a first set of service account credentials to another based on the use of different remote controls.

FIG. 9 illustrates a flow diagram 900 of the media device 104 transitioning from using a first set of service account credentials 128(1) to another 128(2) based on the use of different remote controls 108. In some implementations the media device 104 may reconfigure to use different credentials 128 corresponding to received control data 116.

Block 902 acquires, based on a first remote control 108(1), first service account credentials 128(1) at a media device 104. As described above, this acquisition may include querying a server 126 such as described in FIG. 7, receiving credentials 128 from the remote control 108 such as described in FIG. 8, and so forth.

Block 904 configures the media device 104 to use the first service account credentials 128(1). Block 906 performs one or more operations using the first service account credentials 128(1).

Block 908 acquires, based on a second remote control 108(2), first service account credentials 128(1) at the media device 104. Block 910 configures the media device 104 to use the second service account credentials 128(2). Block 912 performs one or more operations using the second service account credentials 128(2).

As illustrated in this process, the media device 104 may readily be reconfigured to use different credentials 128. In some implementations, the media device 104 may be configured with no permanent or persistent credentials 128. Instead, the credentials 128 used by the media device 104 may be determined by, or received from, the remote controls 108 used in conjunction therewith. As described above, the techniques and systems described allow for easy distribution of service account credentials 128 between media devices 104.

Figure 10:
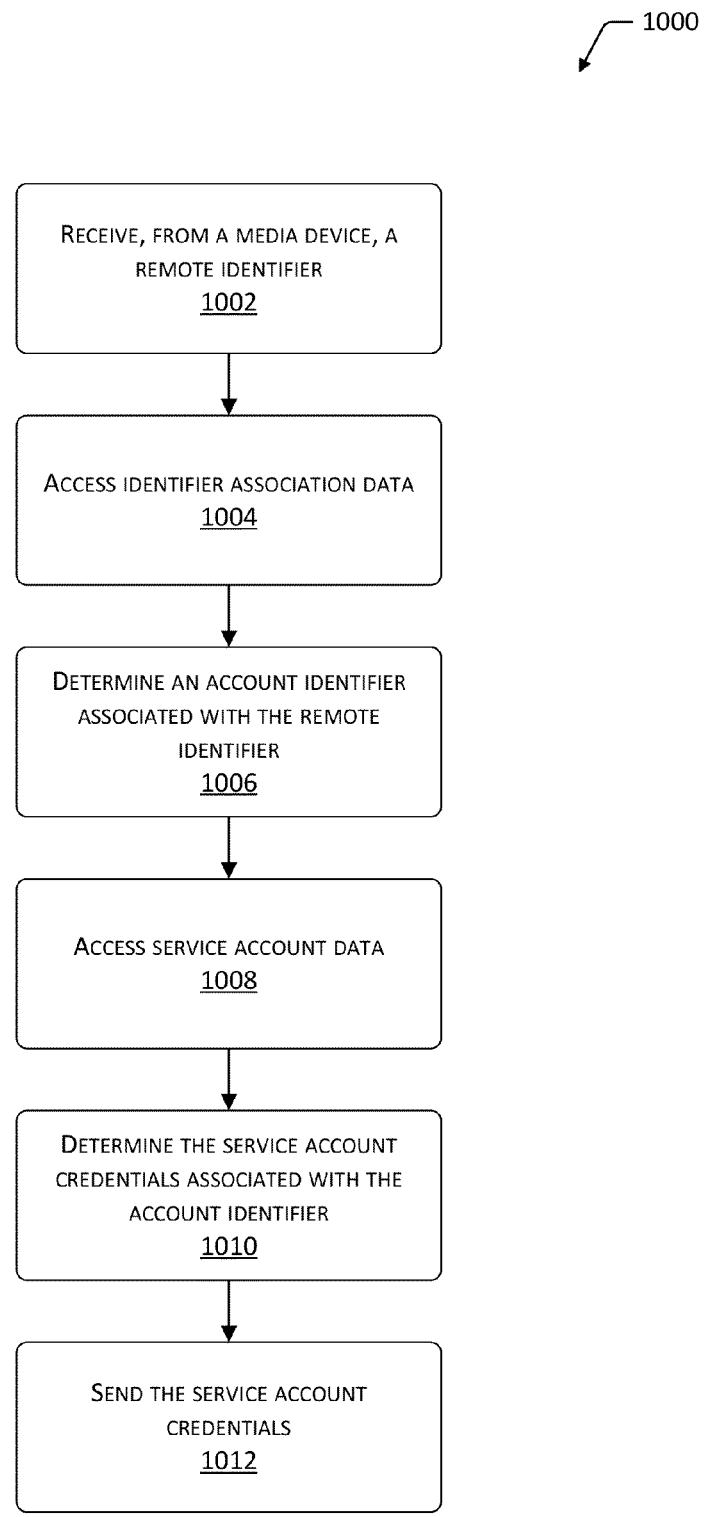
FIG. 10 illustrates a flow diagram of the server receiving a remote identifier and returning service account credentials to a media device.

FIG. 10 illustrates a flow diagram 1000 of the server 126 receiving the remote identifier 114 from the media device 104 and returning the service account credentials 128 to the media device 104. This process may be performed at least in part by the server 126.

Block 1002 receives, from a media device 104, a remote identifier 114. As described elsewhere, the remote identifier 114 is indicative of a remote control 108 in communication with the media device 104. For example, the remote identifier 114 may comprise at least a portion of a header of a packet sent from the remote control 108 to the media device 104.

Block 1004 accesses identifier association data 136. As described elsewhere in this disclosure, the identifier association data 136 comprises information indicative of a relationship between one or more remote identifiers 114 and one or more account identifiers 202. The identifier association data 136 may be generated in various ways.

As described elsewhere in this disclosure, in one implementation information about an order for the remote control 108 may be used to generate the identifier association data 136. This implementation may include accessing an order for one or more of physical or electronic delivery of the remote control 108. The order may comprise information indicative of the remote identifier 114 of the remote control 108 as delivered, and an account identifier 202 used to place the order.

Based on the order, the identifier association data 136 that relates the remote identifier 114 with the account identifier 202 may be generated. The account identifier 202 which is associated with the remote identifier 114 may be provided to the service provider. The service provider may query a datastore and return the service account credentials 128 to the server 126.

The server 126, which now has the service account credentials 128 associated with the account identifier 202, may generate the service account data 138 that relates the account identifier 202 to the service account credentials 128. For example, an entry may be made to the table storing the service account data 138.

In another implementation, the identifier association data 136 may be based at least in part on log data received from one or more of the media device 104, the remote control 108, or another device. In this implementation, the log data provides information indicative of contemporaneous use of the remote identifier 114 and the account identifier 202. For example, the media device 104 may provide log data which indicates control data 116 received from the remote identifier 114 and which was used while a particular account identifier 202 was logged into a media device 104. Based on the log data, the identifier association data 136 may be generated that relates the remote identifier 114 with the account identifier 202.

In yet another implementation, the identifier association data 136, the service account data 138, or both, may be manually entered by the user 102. For example, a user interface may be provided which is configured to display the remote identifier 114 of the remote controls 108 which are in communication with the media device 104 and allow the user 102 to relate one or more of the remote controls 108 to particular account identifiers 202.

Block 1006 determines the account identifier 202 associated with the remote identifier 114 received from the media device 104. For example, the determination may comprise a lookup from a table containing the remote identifiers 114 and the account identifier 202.

Block 1008 accesses service account data 138. As described elsewhere in this disclosure, the service account data 138 comprises information indicative of a relationship between one or more account identifiers 202, one or more services 204, and the service account credentials 128 associated with the services 204. As also described elsewhere in this disclosure, the service account credentials 128 are configured to provide access to a service 204 by a service provider.

Block 1010 determines the service account credentials 128 associated with the account identifier 202. For example, the determination may comprise a lookup from a table containing the service account credentials 128 and the account identifier 202.

Block 1012 sends the service account credentials 128. In one implementation, the service account credentials 128 may be provided to the media device 104 which sent the remote identifier 114. For example, the server 126 may transmit the service account credentials 128 to the media device 104 via the network 122.

In another implementation, the service account credentials 128 may be sent to the service provider of the service 204. For example, the service account credentials 128 "Mango" may be provided to the "AlphaTV" service 204. For example, the server 126 may transmit the service account credentials 128 to the media device 104 via the network 122.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a nontransitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
 a media device comprising:
  a communication interface;
  a memory storing computer-executable instructions; and
  a hardware processor communicatively coupled to the communication interface and the memory, the hardware processor configured to execute the computer-executable instructions to:
   receive a remote identifier from a remote control device;
   receive play control data from the remote control device, wherein the play control data is indicative of one or more user inputs to the remote control device associated with playing content from a service provider;
   provide the remote identifier to a server via the Internet using the communication interface;
   receive, by the media device, service account credentials associated with the remote identifier, wherein the service account credentials are configured to convey permission to access the content;
   establish, by the media device, communication with the service provider using the service account credentials, wherein the service provider is configured to provide to the media device access to the content based on the service account credentials;
   based at least on the play control data, request, by the media device, the content from the service provider using the service account credentials;
   receive, at the media device, the content from the service provider; and
   cause the content to be played on a display screen.

2. The system of claim 1, further comprising the server:
 the server comprising:
  a second communication interface;
  a second memory storing computer-executable instructions; and
  a second hardware processor communicatively coupled to the second communication interface and the second memory, the second hardware processor configured to execute the computer-executable instructions to:
   access an order made to a merchant for delivery of the remote control device, the order comprising information indicative of the remote identifier of the remote control device and an account identifier used to place the order;
   generate identifier association data that associates the remote identifier with the account identifier;
   provide the service provider with the account identifier;
   receive the service account credentials; and
   generate an association between the remote identifier and the service account credentials.

3. The system of claim 1, wherein the remote control device comprises:
 a second communication interface;
 a second memory storing computer-executable instructions;
 an input device;
 an output device; and
 a second hardware processor communicatively coupled to the second communication interface, the second memory, the input device, and the output device, the second hardware processor configured to execute the computer-executable instructions to:
  present a remote control user interface using the output device;
  receive the one or more user inputs associated with playing content using the input device;

generate at least a portion of the remote identifier;
generate the play control data indicative of a command to play the content; and
send the remote identifier and the play control data to the media device using the second communication interface.

4. A computer-implemented method executable on a device, the method comprising:
receiving, by a media device, a remote identifier from a remote control;
receiving, by the media device, service account credentials from the remote control;
receiving, by the media device, control data from the remote control;
establishing, by the media device using the service account credentials, communication with a service provider configured to provide access to content based on the service account credentials;
based at least on the control data, requesting, by the media device, the content from the service provider using the service account credentials;
receiving, at the media device, the content from the service provider; and
performing one or more operations associated with presentation of content from the service provider, using the control data and the service account credentials.

5. The computer-implemented method of claim 4, further comprising:
receiving a packet from the remote control; and
determining a remote identifier from the remote control in a header of the packet, wherein the remote identifier provides data indicative of the remote control and wherein one or more of the establishing communication with the service provider or performing the one or more operations is based at least in part on the remote identifier.

6. The computer-implemented method of claim 5, wherein the remote identifier comprises a universally unique identifier ("UUID") value.

7. The computer-implemented method of claim 4, further comprising:
discontinuing, based on subsequent receipt of the service account credentials, use of previously acquired service account credentials.

8. The computer-implemented method of claim 4, further comprising designating the service account credentials as unavailable after a time period during which no further control data is received and the one or more operations are concluded.

9. The computer-implemented method of claim 4, wherein performing the one or more operations associated with the presentation of content comprise one or more of:
retrieving a list of content associated with the service account credentials;
initiating streaming of the content;
stopping or pausing the presentation of the content; or
transitioning from a first presentation point in the content to a second presentation point in the content.

10. The computer-implemented method of claim 4, the receiving the service account credentials further comprising:
receiving a packet from the remote control, wherein the service account credentials are stored in a payload portion of the packet.

11. The computer-implemented method of claim 4, further comprising executing, by the remote control, a virtual remote control module configured to present a user interface and accept user input, wherein the control data is representative of the user input.

12. The computer-implemented method of claim 4, further comprising:
receiving, from the service provider, data indicating validity of the service account credentials with respect to the content.

13. A computer-implemented method executable on a device, the method comprising:
receiving, at a server device, a remote identifier from a media device, the remote identifier indicative of a remote control in communication with the media device;
accessing, by the server device, identifier association data comprising information indicative of a relationship between the remote identifier and an account identifier;
determining, by the server device, the account identifier associated with the remote identifier received from the media device;
accessing, by the server device, service account data comprising information indicative of a relationship between the account identifier and service account credentials that are configured to provide access to a service by a service provider;
determining, by the server device, the service account credentials associated with the account identifier; and
sending, by the server device, the service account credentials to the media device to establish communication with the service provider for accessing content of the service provider according to the service account credentials.

14. The computer-implemented method of claim 13, further comprising:
accessing an order for one or more of physical or electronic delivery of the remote control, the order comprising information indicative of the remote identifier of the remote control as delivered and the account identifier used to place the order;
generating, based on the order, the identifier association data that relates the remote identifier with the account identifier;
providing the account identifier to the service provider;
receiving the service account credentials from the service provider; and
generating, based on the received service account credentials, the service account data that relates the account identifier to the service account credentials.

15. The computer-implemented method of claim 13, further comprising:
receiving log data from the media device indicative of contemporaneous use of the remote identifier and the account identifier; and
generating, based on the log data, the identifier association data that relates the remote identifier with the account identifier.

16. The computer-implemented method of claim 13, the sending the service account credentials further comprising transmitting the service account credentials to the media device.

17. The computer-implemented method of claim 13, the sending the service account credentials further comprising transmitting the service account credentials to the service provider.

18. A computer-implemented method executable on a device, the method comprising:
accessing an order for a remote control;

determining an account identifier associated with the order;

determining a remote identifier associated with the remote control as ordered;

generating identifier association data that associates the account identifier with the remote identifier;

storing the identifier association data;

generating service account data that associates the account identifier with service account credentials;

storing, at a server, the service account data;

receiving the remote identifier at the server via a network; and sending, by the server, the service account credentials associated with the remote identifier from the service account data, wherein the service account credentials are configured to convey permission to access content.

19. The computer-implemented method of claim 18, wherein the accessing the order further comprises:

accessing the order made to a merchant for delivery of the remote control; and determining, from the order, information indicative of the remote identifier of the remote control and the account identifier used to place the order.

20. The computer-implemented method of claim 18, wherein the remote control comprises an application configured for execution on a processor, and further wherein the order comprises a request for electronic delivery of the application.

* * * * *